United States Patent Office 3,409,599
Patented Nov. 5, 1968

3,409,599
METHOD FOR IMPROVING COLOR STABILITY OF POLYSULFONES
Ronald S. Bauer, Orinda, and Kenneth C. Dewhirst, San Pablo, Calif., assignors to Shell Oil Company, New York, N.Y., a corporation of Delaware
No Drawing. Filed July 29, 1966, Ser. No. 568,753
10 Claims. (Cl. 260—79.3)

ABSTRACT OF THE DISCLOSURE

The color stability of hydrogenated polysulfone copolymers of a conjugated diolefin and sulfur dioxide and, optionally, a third ethylenically unsaturated comonomer, is improved by treating the copolymers or their hydrogenation products with a small amount of a salt of a weak acid, e.g., potassium cyanide.

---

This invention relates to an improved method for preparing useful polysulfones.

It has recently been found that useful polymers are hydrogenated copolymers of a conjugated diolefin with sulfur dioxide and terpolymers and quaterpolymers of a conjugated diolefin, sulfur dioxide and an ethylenically unsaturated hydrocarbon. These polymers are highly stable and have properties which make them suitable for many uses such as in preparing sheets and films, compression molding, injection molding, melt spinning and the like. These useful polymers are prepared by copolymerizing a conjugated diolefin and sulfur dioxide or in the case of terpolymers and quaterpolymers, polymerizing with one or two additional ethylenically unsaturated hydrocarbon monomers, respectively, followed by hydrogenation of the unsaturated polymers. Such polymers are disclosed in greater detail in U.S. Patents 3,336,272–274 to Youngman et al.

In processing polymers in order to prepare useful articles it is generally necessary to heat the polymers to at least their softening point thereby taking advantage of the thermoplastic properties. Thus, in order to be of commercial value, a thermoplastic polymer must be stable at the elevated temperatures to which they will be subjected. In melt spinning or blow molding, for example, temperatures used are generally significantly above the polymer melting or flow points. Unlike their unsaturated precursors, which decompose to a great extent at temperatures below their melting points or flow points, the hydrogenated polysulfones are quite stable at the elevated temperatures which are desirable in shaping thermoplastic products. However, in processing these stable polymers at elevated temperatures and particularly in melt spinning, blow molding, injection molding techniques and the like, it has been found that the finished products possess a residual color ranging from a yellowish or golden cast to dark brown. It is believed that this color instability is due at least in part to unstable polymer end groups which become modified at higher temperatures. In addition it is found that when the hydrogenation catalyst used is of the homogeneous variety and more particularly a rhodium complex catalyst, as will be more clearly defined hereinafter, residual catalyst is present in the polymer which catalyst residue upon heating causes color instability.

In the preparation of products such as moldings, films, fibers, etc. from polymers one of the most important qualities of the polymer used is that it be generally colorless. This quality is especially important where the product is to be dyed or colored during its processing. A residual color present in the polymer is undesirable since it makes further selective coloring of the products prepared therefrom difficult, if not impossible.

It is an object of this invention to provide a method for preparing polysulfones which have improved color stability. It is also an object of the invention to prepare substantially colorless polysulfones which do not become discolored when subjected to elevated temperatures or aging. These and other objects will become apparent from the following description of the invention.

It has now been found that clear and color-stable polysulfones may be prepared by treatment of the polysulfones with an aqueous solution of a salt of a weak acid.

The improved polysulfones are those prepared by copolymerizing a conjugated diolefin and sulfur dioxide or terpolymerizing or quaterpolymerizing with one or more other ethylenically unsaturated hydrocarbons in the presence of a free radical initiator followed by hydrogenation of the unsaturated polymers. The treatment of the polymers according to the invention may be accomplished prior to or following hydrogenation.

The polysulfones may be prepared by a number of different methods. One of the methods which may be used for polymerizing the monomers is by emulsion polymerization. By this method polymerization takes place in an aqueous medium with the aid of emulsifying agents. The monomeric hydrocarbon reactants are present almost entirely as emulsion or suspension.

The emulsifying agent used is not critical and may be anionic, cationic or non-ionic. However, since the aqueous phase is present usually in greater quantity than the oil phase, the use of anionic agents resulting in an oil-in-water type emulsion may be preferred. Suitable emulsifying agents which may be used include such materials as the fatty acids and their soaps including substituted derivatives of the fatty acids and rosin acids, sulfuric esters including salts of sulfated fatty oils and alcohols, alkane sulfonates, alkaryl sulfonates, mahogany and petroleum sulfonates, as well as phosphorus-containing emulsifying agents. Some specific examples include the alkali metal salts of $C_{12}$ to $C_{18}$ straight chain carboxylic acids, i.e., sodium stearate, sodium oleate, and mixtures thereof as acids obtained from tallow, coconut oil, palm oil, etc., tall oil acid soaps, sodium lauryl sulfate, sodium dodecylbenzene sulfonate, sodium di(2-ethylhexyl)orthophosphate and the like. Any amount of emulsifying or suspending agent may be used which will provide at least a relatively stable emulsion or suspension of the polymerization ingredients. Generally, from about 0.5 to about 10% by weight of emulsifying agent is sufficient.

Another method of preparing unsaturated polysulfones is by polymerizing in the presence of a suitable solvent in which the polymers are soluble or at least swollen. Since in order to effectively hydrogenate the unsaturated precursors they must first be placed in solution or at least swollen in the solvent, this provides an efficient method by which the unsaturated polymer may be prepared and then directly hydrogenated without separation from the polymerization mixture. Suitable solvents are those used in the hydrogenation phase as mentioned below.

The polysulfones may also be prepared by reacting sulfur dioxide with the hydrocarbon monomer or monomers in the monomer medium itself. In this method no additional diluents, solvents or agents are necessary thereby greatly increasing the ease by which the unsaturated polymers are recovered. Thus, sulfur dioxide and free radical initiating catalyst are simply added to the hydrocarbon monomer or mixtures of monomers. Sulfur dioxide concentrations are maintained at a low level throughout the polymerization, preferably with a mole ratio of hydrocarbon monomer(s):sulfur dioxide between about 10:1 and 200:1. In certain circumstances it may be desirable to include in the polymerization media or add to the polymerization media as the polymer conversion increases, an inert volatile alkane diluent such as propane, butane, isopentane, hexane, etc. Such a diluent aids in removing heat of polymerization and maintaining solid polymer in a fluid slurry.

The ratio of different hydrocarbon monomers used in preparing terpolymers and quaterpolymers may be varied depending on the respective amounts of different monomer-derived units desired in the polymer. The ratios of conjugated diolefin to other ethylenically unsaturated monomer between about 1:20 and about 20:1 are useful in order to prepare polymers having hydrocarbon monomer derived units within this range.

The polysulfones prepared as described above are those characterized by the repeating structural units (I)  $-(MSO_2)-$ or the imperfectly alternating units (II)  $-(M_nSO_2)-$ wherein M is a hydrocarbon monomer derived unit and $n$ is a number, the average of which in a single molecule is equal to or greater than 1.1 and preferably less than about 20. The copolymeric sulfones are those wherein M is a diolefin derived radical. In the ter-, quater-, and higher polymers M is derived from the different types of hydrocarbon monomers in the reaction mixture with the units derived from different types of monomers statistically distributed throughout the polymer according to the relative monomer reactivities and their concentration in the polymerization media. The imperfectly alternating polysulfones are described in copending application Ser. No. 545,559, filed Apr. 27, 1966.

In order to prepare useful products from the unsaturated polysulfones recovered from the polymerization processes, as set forth above, they must be hydrogenated. In order to effectively hydrogenate an unsaturated polysulfone, it must be placed in a suitable solvent in which the polymer is soluble or at least swollen. Suitable solvents include sulfolane, polyfluorinated alcohols such as trifluoroethanol, hexafluoroisopropanol, nonafluoro-t-butanol, 2-phenyl hexafluoroisopropanol, etc., and phenolic solvents such as phenol, m-cresol, p-chlorophenol and the like. In the case of some of the equimolar alternating copolymeric sulfones and especially that from butadiene and the butadiene-containing terpolymeric sulfone containing only small amounts of hydrocarbon termonomer, the polymer-solvent interaction at temperatures below the decomposition point may be limited to swelling.

The catalyst systems used in the hydrogenation reaction may be heterogeneous or homogeneous. Suitable heterogeneous catalysts include for example, platinum, rhodium, osmium, ruthenium, iridium, palladium, rhenium, nickel, cobalt, copper, chromium, iron and compounds thereof such as oxides, sulfides, carbonyls, etc. These catalysts may be used alone or supported on a relatively inert material such as carbon, diatomaceous earth, alumina, silica, asbestos, pumice, etc. In order to achieve more efficient hydrogenation it may be necessary to keep the heterogeneous catalysts dispersed throughout the polymer-containing solution such as by stirring the reaction mixture or agitating the reaction vessel. Amounts of catalyst between about 0.01 and 10% and preferably between about 0.1 and 5% by weight based on the polymer may be used.

Homogeneous catalysts offer the advantages of being rapidly dispersed throughout the reaction medium and of being less readily poisoned, thus permitting the hydrogenation of polysulfones which are only swollen by the solvent. Such homogeneous catalysts include homogeneous rhodium halide complex catalyst having the formula

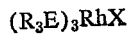 $(R_3E)_3RhX$ wherein X is a halogen and preferably chlorine or bromine, E is phosphorus or arsenic and R is an organo group of from 1 to 20 and preferably 1 to 10 carbon atoms and having only aromatic unsaturation. Suitable R groups are, for example, hydrocarbyl groups such as methyl, ethyl, propyl, isopropyl, isooctyl, decyl, cyclohexyl, cyclooctyl and substituted derivatives thereof such as bromomethyl, 3-(diethylamino)propyl, etc. R may also be aromatic hydrocarbyl groups such as phenyl, tolyl, xylyl, p-ethylphenyl, p-tert-butylphenyl, etc. and substituted derivatives thereof. The R groups may be the same or different, but those wherein they are the same are preferred. The trihydrocarbylphosphines or arsines, $R_3E$, are in actuality stabilizing ligands for the rhodium halide molecules examples of which included triethylphosphine, tributylphosphine, triphenylphosphine, tris(4-methoxyphenyl)phosphine, tris(3-chlorophenyl)phosphine, diethylphenylphosphine, diphenylbutylphosphine, phosphine, tributylphosphine, triphenylphosphine, tris(4-phenyl phosphine is generally preferred because of its availability. Suitable methods of preparing the useful rhodium halide complex catalysts are disclosed in copending application, Ser. No. 417,482 filed Dec. 10, 1964. The amount of catalyst used is sufficient to provide from about 50 to 2000 p.p.m. and preferably from 100 to 1000 p.p.m. rhodium based on the polymer.

It is known that sulfur dioxide is poisonous to most catalysts, thereby rendering them ineffective for hydrogenation; the presence of free sulfur dioxide should be avoided at the time of hydrogenation. This is especially important when the hydrogenation directly follows the polymerization by a method wherein an excess of sulfur dioxide is used or when polymerization is interrupted before complete conversion of the monomers.

The hydrogenation reaction temperature may be from about room temperature, i.e., approximately 20° C., to about 200° C. with temperatures between about 80° and 130° C. being preferred. The rate of hydrogenation will depend upon the particular polymer being reduced, the solvent, temperature, catalyst, solution viscosity, pressure, etc. Although hydrogenation would proceed slowly at one atmosphere of hydrogen pressure, it is normally desirable to use a large excess of hydrogen and thus hydrogen pressures of up to 10,000 p.s.i. or higher may be used, the preferred range is between about 500 and 2000 p.s.i. The hydrogen may be bubbled through the polymer containing solution or slurry of swollen polymer or may be charged into a closed reaction vessel under pressure and then mixed with the solution by suitable means. The hydrogenation of the unsaturated polysulfones by the method as disclosed herein only affects the ethylenic unsaturation and does not in any way reduce the stable sulfone portion of the polymers.

Although for some products, complete hydrogenation may be desirable it is not necessary since any degree of hydrogenation of the original ethylenic unsaturation above about 50% results in highly stable and high melting polymers. In the case of highly crystalline polysulfones it is found above about 50% that the degree of hydrogenation may be varied without greatly sacrificing the crystallinity. The hydrogenated polymers have molecular weights of between about 20,000 and 1,000,000 as characterized by intrinsic viscosity of from about 0.5 to 5.5 dl./g. determined in a 1:1 mixture of m-cresol and p-chlorophenol at 25° C.

The salts of weak acids used to treat the polysulfones may be any metal or ammonium salt of a weak acid. Suitable acids include carboxylic acids such as formates, acetates, propionates, butyrates, isobutyrates, citrates, fumarates, phenates, lactates, naphthenoates, salicylates, succinates, inorganic acid salts such as borates, bicarbonates, carbonates, cyanide, thiocpanates, hypochlorites, nitrites, tellurates, etc. All of these acids are characterized by pK values (negative logarithm of the dissociation constant K) of at least about 3. The metal moiety of the salt may be any metal. Particularly preferred because of availability are the alkali and alkaline earth metals such as sodium, potassium, lithium, calcium, barium, strontium, etc., as well as ammonium.

The weak acid salt is preferably added in aqueous solution which is then thoroughly mixed with a solution of the polysulfone. The amount of salt to be added to the polymer solution should be such as will provide from about 0.001 to about 5% of salt based on the amount of polymer present. This polysulfone solution may be treated with the salt before or after hydrogenation. The salt should be thoroughly mixed with the polymer solution.

Where the hydrogenation catalyst is a homogeneous rhodium complex catalyst, the preferred acid salt used to treat the hydrogenated polymers is a cyanide such as potassium cyanide. The cyanide salt not only stabilizes the polysulfone for color but also complexes with the rhodium catalyst, thereby aiding in rhodium recovery from the polymer and the hydrogenation mixture. An additional attractive feature of using a cyanide salt to treat the polymers is that the treated polysulfones have enhanced flow properties. Thus, the melt flow properties of the polymer are improved which is especially desirable in extrusion or injection processes which are dependent on melt flow properties of the polymer.

The hydrogenated polymers which are recovered after treatment with the acid salt are clear or whitish polymers which may be heated to their melting point or flow point without significant discoloration or darkening. Thus, these stable polysulfones may be processed at elevated temperatures without color degradation and yet may be treated with pigments, dyes, or other coloring agents to prepare products having practically any desired color.

The following examples are provided to illustrate the manner in which the invention is carried out. It is to be understood that the examples are given for the purpose of illustration and the invention is not to be regarded as limited to any of the specific compounds or conditions recited therein.

Example I

A polysulfone prepared by terpolymerizing butadiene, sulfur dioxide and piperylene was hydrogenated in m-cresol in the presence of chlorotris(triphenylphosphine)rhodium (I). The terpolymer contained 60% piperylene and 40% butadiene-derived units in the hydrocarbon portion of the polymer and contained no residual ethylenic unsaturation and possessed an intrinsic viscosity of 1.03 dl./g. as determined in 1:1 mixture of m-cresol and p-chlorophenol at 25° C. The polymer also had a melt index of 9.0 g./10 min. (240° C., 2.2 kg.).

(a) 100 g. of the hydrogenated terpolymer was treated with 10 ml. of a 10% aqueous solution of potassium cyanide immediately after hydrogenation. The polymer was recovered, dried and then heated to 240° C. for about 10 minutes and melt spun into fibers. The fibers were clear and colorless. The treated polymer possessed an intrinsic viscosity of 1.03 dl./g. and melt index of 33.0 g./10 min. (240° C., 2.2 kg.).

(b) By comparison another 100 g. sample of the same hydrogenated terpolymer which was not treated with the potassium cyanide was similarly heated to 240° C. for about 10 minutes and melt spun. The fibers were a dark brown color.

Example II

Four samples (100 g.) of the hydrogenated butadiene-sulfur dioxide-piperylene terpolymer of Example I were respectively treated with 10 ml. of a 10% aqueous solution of (a) sodium borate
(b) potassium acetate
(c) sodium bicarbonate and
(d) potassium thiocyanate immediately following hydrogenation. The polymers were recovered, dried and melt extruded at 240° C. In each case the fibers were essentially colorless to very light yellow. When the same terpolymer is hydrogenated with a heterogeneous catalyst (Raney nickel or platinum) instead of the complex rhodium catalyst, the melt spun fibers are colorless. The melt index of the treated polymers was between 9 and 10 g./10 min. (240° C., 2.2 kg.).

Example III

To a 100 g. sample of a terpolymer used in Example I dissolved in m-cresol was added 0.5 g. of solid sodium phenoxide. The mixture was then hydrogenated at 1000 p.s.i. of hydrogen in the presence of chlorotris(triphenylphosphine)rhodium (I). The polymer, which contained no residual ethylenic unsaturation, was recovered and dried and heated and extruded as set forth in Example I. The fibers were essentially colorless to very light yellow.

We claim as our invention:

1. A method for improving the color stability of a polysulfone selected from the group consisting of copolymers of a conjugated diolefin having from 4 to about 8 carbon atoms and sulfur dioxide and copolymers of a conjugated diolefin having from 4 to about 8 carbon atoms, sulfur dioxide and at least one copolymerizable ethylenically unsaturated monomer having 2 to about 20 carbon atoms, and of the hydrogenation products of said copolymers, comprising treating said polysulfone with from about 0.001 to about 5% by weight of a salt of a weak acid, said acid having a pK of at least about 3 in aqueous solution.

2. A method as set forth in claim 3 wherein said copolymer is a terpolymer of butadiene, sulfur dioxide and a conjugated diolefin of from 5 to about 8 carbon atoms.

3. A method as set forth in claim 1 wherein the salt is selected from the group consisting of salts of alkali metals, salts of alkaline earth metals and ammonium salts.

4. A method as set forth in claim 3 wherein said salt is a cyanide.

5. The method as set forth in claim 4 wherein said salt is potassium cyanide.

6. A method as set forth in claim 3 wherein said treating comprises the step of contacting a solution of said copolymer with an aqueous solution of said salt.

7. The method as set forth in claim 6 wherein said salt is a cyanide and said copolymer is a terpolymer of butadiene, sulfur dioxide and a conjugated diolefin of from 5 to about 8 carbon atoms.

8. The method as set forth in claim 7 wherein said salt is potassium cyanide.

9. The method as set forth in claim 3 wherein said treating comprises contacting a solution of hydrogenation product of said copolymer with an aqueous solution of said salt.

10. The method according to claim 9 wherein said salt is a cyanide and said copolymer is a terpolymer of butadiene, sulfur dioxide and a conjugated diolefin of from 5 to about 8 carbon atoms.

References Cited

UNITED STATES PATENTS 2,183,830 12/1939 Burroughs.
3,336,273 8/1967 Youngman et al.

JOSEPH L. SCHOFER, *Primary Examiner.*

D. K. DENENBERG, *Assistant Examiner.*